Dec. 13, 1966   J. D. RICKER   3,291,150
PRESSURE RELIEF VALVE ASSEMBLY
Filed Aug. 27, 1963
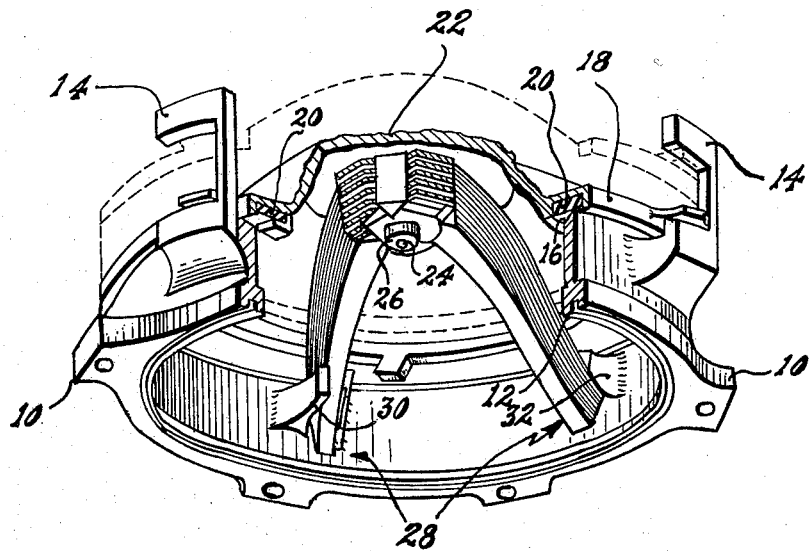
INVENTOR.
JOHN D. RICKER
BY
Sherman H. Goldman
ATTORNEYS United States Patent Office 3,291,150
Patented Dec. 13, 1966

3,291,150
PRESSURE RELIEF VALVE ASSEMBLY
John D. Ricker, Rochester, N.Y., assignor, by mesne assignments, to the United States of America as represented by the Secretary of the Air Force
Filed Aug. 27, 1963, Ser. No. 305,010
6 Claims. (Cl. 137—541)

This invention relates generally to pressure relief valves and more particularly to a valve which operates when the fluid pressure on one side of the valve exceeds the pressure on the other side sufficient to balance a preset spring force. At this point the valve snaps fully open to allow gas or fluid to escape thereby inhibiting further pressure build-up.

The pressure relief valve of this invention depends upon the utilization of a spring having a negative stiffness factor, i.e., the spring force decreases with increasing deflection. The cycle is repetitious as long as there is a recurring pressure build-up and release. Prior art type valves, utilizing conventional diaphragms, vibrate excessively and are, therefore, subject to a shortened life. Solenoid operated valves have been proposed to produce the result achieved by the pressure relief valve of this invention; however, systems utilizing electromechanical components are prone to reliability problems. A spring loaded poppet valve would not provide the desired result since adequate flow area would not be developed until the pressure difference became appreciably higher than the static set-point. The range pressure needed to sense that the set-point has been exceeded is appreciably less in the mechanical system of this invention over one utilizing an electrical transducer or a spring having a positive stiffness factor.

Accordingly, it is a primary object of this invention to provide a pressure relief valve which is completely mechanical and which eliminates the problem of excessive wear of its components.

It is another object of this invention to provide a mechanical pressure relief valve which is extremely reliable and eliminates the disadvantages of the prior art devices.

It is still another object of this invention to provide a pressure relief valve which utilizes a spring having a negative stiffness factor.

It is a further object of this invention to provide a pressure relief valve, which, upon a preset pressure differential snaps open fully and closes upon release of the pressure differential with an infinitesimal pressure range required to sense the exceeding of the set-point.

Another object of this invention involves the provision of a pressure relief valve suitable for use with a record enclosure to exhaust gas therefrom such that a constant pressure differential is maintained.

Still another object of this invention to provide a pressure relief valve which is easy to manufacture of standard, conventional, currently available materials which lend themselves to standard, mass production manufacturing techniques.

These and other advantages, features and objects of the invention will become more apparent from the following description taken in connection with the illustrative embodiment in the accompanying drawing, wherein:

The figure comprises a pictorial view, partly in section, of the assembled pressure relief valve in a closed position, and in dotted lines in the open position.

The compact, completely mechanical valve of this invention is described in accordance with the design criteria for sealing an enclosure of approximately 14 cubic feet at .27 p.s.i. with a limiting of the pressure difference across the enclosure to .33 p.s.i. when the external pressure is increasing from .5 to 14.7 p.s.i. at a .22 p.s.i. per second rate.

Referring to the figure, there is shown a relief valve holder or housing 10 which is generally cylindrical in form and has an annulate grooved portion at 12 in the base thereof for the insertion of an O-ring when the device is applied to a mating flange on a vessel to be protected against a designated pressure differential. The holder or housing 10 has mounted thereon a series of stops 14, as shown. The stops are arranged to limit the motion of the pressure relief valve to a fixed, fully opened position by engaging a flange of the valve. A seat for the pressure relief valve is provided by an annular, generally pointed projection or ring 16 formed by the top wall of the holder 10.

The pressure relief valve is mounted beneath the stops 14 such that a flange 18 encompasses the annular projection 16. A flexible gasket 20 is provided within the hollowed annular flange 18 for sealing against the annular ring 16. The remainder of the relief valve is generally dish-shaped plate 22, as shown in the figure, with its outermost periphery forming the annular flange 18. A hole is provided in the center of the dish-shaped plate and a bolt 24 and nut 26 are used to secure a spring assembly 28. The spring assembly 28 comprises a series of stacked leaves wherein successive leaves are rotated 90°. The springs may be lengthened, but not appreciably shortened without nullifying the negative stiffness factor. However, the number of springs may be varied to produce any desired opening force. It has been found that approximately 76 leaves of .003 inch thickness, which are deflected into an acute parabolic curvature, provide the desired result for the disclosed design criteria. Various lengths may be utilized for the leaves forming the spring unit.

A pair of diametrically opposed U-shaped projections 30, only one of which is shown, are provided on the interior of the holder or housing 10 against which opposite ends of like oriented leaves of the spring assembly 28 rest. At 90° intervals from the U-shaped projections are a pair of undercut projections 32 to provide support for the ends of the remaining portion of the leaf spring assembly 28. Preferably the projections 30 and 32 or the surfaces of the springs which engage these projections are coated with a friction reducing material such as tetrafluoroethylene.

Since the valve spring force decreases with deflection, the fully opening position defines a lowered pressure difference below which motion will be initiated in the closed direction. This pressure differential is known as the minor set-point while the major set-point is the pressure differential for opening the valve. The frequency of oscillation of the valve assembly is a function of the rate of change of external pressure, the degree to which the open area exceeds the requirement for a given volume and rate, and the ratio of major set-point to minor set-point, which in turn is a function of the value of the negative spring constant, i.e., the initial deflection and the total deflection. Thus, the valve operation frequency is not a function of either the moving mass or the spring stiffness.

Basically, since the pressure relief valve utilizes a spring loaded valve plate 22 with the spring force inversely proportional to deflection, a pressure differential across the valve plate area is sufficient to balance the preset spring force, thereby moving the valve to start to open. Movement of the valve continues until the stop portion 14 provides a limitation of the movement of the valve plate as shown by the dotted line portion of the figure. The valve remains unseated from projection 16 until flow through the valve causes the pressure difference to drop below the balance point associated with the reduced spring force at the minor set-point. Upon a sufficient reduction in pressure the valve moves to its fully closed position such that the annular flange 18 containing the gasket 20 is seated against the annular projection 16. The cycle repeats itself as long as there is a recurring build-up and release of pressure across the valve plate.

Since the maximum flow area is reached after only a small increment of pressure rise above the set-point, severe transient pulses and rapid pressure fluctuation rates may be attenuated without appreciably exceeding the pressure difference being maintained when the valve is sealed. Also, the mass of the pressure relief valve, because of the negative stiffness factor, avoids resonance when driven by a sinusoidal input because force and deflection are no longer directly proportional when the valve is opened. It should be noted, however, that the negative spring constant principle is utilized to its fullest extent only if the valve's open position flow area is in excess of the area requirement for whatever rate of pressure rise against which protection is desired.

The structure of the figure may be utilized in an application to an enclosure in order to obtain a proper bleed-out. It is desired in one particular application to confine moisture at a maximum stated pressure level of .25 p.s.i. The valve built according to the description relative to the figure was able to exhaust the enclosure air at a rate such that the pressure differential did not exceed the .25 p.s.i. level associated with final quiescent conditions.

Although the invention has been described with reference to a particular embodiment, it will be understood to those skilled in the art that the invention is capable of a variety of alternative embodiments within the spirit and scope of the appended claims.

I claim:

1. A pressure relief valve unit comprising a housing, an annular seat formed by a portion of said housing, a valve plate adapted to overlie said seat to be sealed thereagainst, and a spring secured to said valve plate and bearing against said housing for exerting a predetermined force the overcoming of which allows the said valve plate to move to its open position, said spring having a negative stiffness factor and being comprised of a series of stacked leaves, wherein each successive leaf is rotated 90° apart with respect to its adjacent leaves.

2. A pressure relief valve unit capable of moving to its fully opened position upon a preset pressure differential comprising a housing, an annular seat formed by a portion of said housing, a valve plate adapted to overlie said seat, said valve plate having a gasket adapted to be sealed against said seat, and a spring secured to said valve plate and bearing against said housing for exerting a predetermined force such that a pressure differential between both sides of said valve plate which exceeds said predetermined force of said spring causes said valve plate to unseat and snap to its fully open position, said spring having a negative stiffness factor and being comprised of a series of stacked leaves, wherein successive leaves are 90° apart.

3. A valve unit as defined in claim 1 including stop means secured to said housing for limiting movement of said valve plate a predetermined distance from said seat.

4. A valve unit as defined in claim 1 wherein said spring is secured to the valve plate at the center of said leaves, the spring being deflected into an acute parabolic curvature.

5. A valve unit as defined in claim 2 including stop means secured to said housing for limiting movement of said valve plate a predetermined distance from said seat.

6. A valve unit as defined in claim 2 wherein said spring is secured to the valve plate at the center of said leaves, the spring being deflected into an acute parabolic curvature.

References Cited by the Examiner

UNITED STATES PATENTS

| 306,568 | 10/1884 | Wilder. | |
|---|---|---|---|
| 1,251,758 | 1/1918 | Dayton | 251—284 X |
| 2,016,390 | 10/1935 | Richardson | 137—543.19 |
| 2,308,475 | 1/1943 | Fawkes | 267—16 |
| 2,325,193 | 7/1943 | Nutt et al. | 267—1 |
| 2,834,374 | 5/1958 | Klinkenberg | 137—541 |
| 2,938,540 | 5/1960 | Schatzman et al. | 251—75 X |

WILLIAM F. O'DEA, *Primary Examiner.*

MARTIN P. SCHWADRON, *Examiner.*

D. LAMBERT, *Assistant Examiner.*